(12) United States Patent
Hölzel

(10) Patent No.: US 8,118,356 B2
(45) Date of Patent: Feb. 21, 2012

(54) VEHICLE ROOF HAVING EXTERNALLY RUNNING SLIDING ROOF

(75) Inventor: Dominik Hölzel, Gröbenzell (DE)

(73) Assignee: Webasto (DE)

(*) Notice: Subject to any disclaimer, the term of this patent is extended or adjusted under 35 U.S.C. 154(b) by 0 days.

(21) Appl. No.: 12/996,447

(22) PCT Filed: May 7, 2009

(86) PCT No.: PCT/DE2009/000643
§ 371 (c)(1),
(2), (4) Date: Feb. 7, 2011

(87) PCT Pub. No.: WO2009/152789
PCT Pub. Date: Dec. 23, 2009

(65) Prior Publication Data
US 2011/0127808 A1    Jun. 2, 2011

(30) Foreign Application Priority Data
Jun. 18, 2008 (DE) .......................... 10 2008 028 941

(51) Int. Cl.
*B60J 7/04* (2006.01)

(52) U.S. Cl. ................................................. 296/216.03

(58) Field of Classification Search . 296/216.02–216.05
See application file for complete search history.

(56) References Cited

U.S. PATENT DOCUMENTS

| | | | | |
|---|---|---|---|---|
| 4,893,869 A | * | 1/1990 | Fuerst | 296/216.03 |
| 6,893,083 B2 | * | 5/2005 | Engl | 296/216.03 |
| 6,916,064 B2 | * | 7/2005 | Bohm et al. | 296/216.04 |

FOREIGN PATENT DOCUMENTS

| | | |
|---|---|---|
| DE | 3906866 C2 | 12/1996 |
| DE | 10143823 A1 | 3/2003 |
| DE | 10143823 C2 | 3/2003 |
| DE | 20218960 U1 | 3/2003 |
| DE | 10201636 A1 | 8/2003 |
| DE | 10253401 A1 | 6/2004 |

OTHER PUBLICATIONS

International Search Report dated Oct. 5, 2009.

* cited by examiner

*Primary Examiner* — Dennis Pedder
(74) *Attorney, Agent, or Firm* — Fitch, Even, Tabin & Flannery LLP

(57) ABSTRACT

A vehicle roof is proposed, comprising a roof opening, which can be either closed or at least partially exposed by means of a cover element, which at its rear edge can be tilted relative to a fixed roof section and which is traversable above the fixed roof section towards the rear of the vehicle and which is guided on both sides relative to a vehicle longitudinal center plane by a front sliding unit in a leading guide rail section and by a rear sliding unit in a rear guide rail section respectively. According to the invention the rear sliding unit is guided on a guide link of the cover element and the tangents of the rear guide rail section and of the guide link of the cover element, projected in the vehicle vertical direction, are at least in part set counter to a vehicle longitudinal axis, so that the rear guide rail section and the guide link fixed to the cover in this projection intersect when the cover element is in an open position.

5 Claims, 3 Drawing Sheets

VEHICLE ROOF HAVING EXTERNALLY RUNNING SLIDING ROOF

CROSS-REFERENCE TO RELATED APPLICATIONS

This Application is a U.S. national phase application filed under 35 U.S.C. §371 of International Application No. PCT/DE2009/000643, filed May 7, 2009, designating the United States, which claims priority from German Patent Application No.: DE 10 2008 028 941.8, filed Jun. 18, 2008, which are hereby incorporated herein by reference in their entirety for all purposes.

The invention relates to a vehicle roof according to the preamble of claim 1.

Such a vehicle roof is disclosed by the publication DE 101 43 823 C2 and comprises a cover element, which serves for either closing or at least partially exposing a roof opening. The cover element is embodied as a so-called externally running sliding roof cover, which at its rear edge can be tilted relative to a rear, fixed roof section and is traversable above the fixed roof section in a rearward direction. For traversing in a vehicle longitudinal direction the cover element is guided on each side relative to a vehicle longitudinal center plane by a vehicle front sliding unit in a front guide rail section and by a vehicle rear sliding unit in a rear guide rail section. The rear guide rail sections, the profile of which is visible through a corresponding slit on the outer shell of the vehicle, each run parallel to a lateral contour of the vehicle roof. For adjusting the width of the guide device for the cover element in a vehicle transverse direction a control arrangement is provided, which comprises levers, which pivot over the travel of the rear sliding units. Such a control arrangement not only takes up additional overall space but also carries with it additional weight. Additional costs also accrue through use of the control arrangement.

For this reason any adjustment of the profile of the rear guide rail sections of externally running sliding roofs to the lateral contours of the vehicle roof has therefore in practice been abandoned. Instead modern, externally running sliding roofs are designed in such a way that the rear guide rail sections are arranged parallel to the vehicle longitudinal axis, that is to say grid-parallel, which in turn means that the covers of the lateral roof spars widen towards the rear of the vehicle. This is greatly to the detriment of the design, however.

The object of the invention, therefore, is to create a vehicle roof of the type referred to in the introduction, in which the profile of the rear guide rail sections to the lateral roof contours is possible taking up little overall space and at low cost.

According to the invention this is achieved by the vehicle roof having the features of claim 1.

According to the invention, therefore, the rear sliding units are each guided on a cover link and the tangents of the respective rear guide rail sections and of the cover links assigned to each of them, projected in the vehicle vertical direction, are at least in part set counter to a vehicle longitudinal direction, so that the relevant rear guide rail section and the assigned cover link in this projection intersect when the cover element is in an open position.

The rear guide rail section, fixed to the roof and assigned to one side of the vehicle roof, and the associated guide link are therefore arranged in such a way that the rear sliding unit lies at a point of intersection between these two elements. In particular, when the cover element is in the open position the rear guide rail section and the assigned guide link are thereby skewed relative to one another, these elements, when the cover element is opened, brushing over one another in the projection in the vehicle vertical direction and the sliding unit also performing a movement in a vehicle transverse direction in addition to the movement in the vehicle longitudinal direction.

This design of a vehicle roof makes it possible, in the case of a cover element which basically does not have a rectangular base area (that is to say its edges do not run grid-parallel) but which with its lateral edges follows the profile of the lateral roof spars and therefore constitutes a so-called rail-to-rail cover, to adjust the rear guide rail sections to the profile of the lateral roof edges simply through correspondingly arranged cover links for guiding the rear sliding units without taking up any additional overall space. This means that the vehicle roof according to the invention, which is provided with an externally running sliding roof cover, can satisfy the most exacting visual standards.

In an appropriate embodiment of the vehicle roof according to the invention the rate of travel of the rear sliding units is less than that of the front sliding units and the cover element. The link tracks or guide rails for the rear sliding units then form a type of travel equalizing device, which is capable of taking up the additional travel covered by the front sliding units. This configuration also makes it possible to make the rear guide rail sections for the rear sliding units of shorter design than the front guide rail sections for the front sliding units, which in turn saves overall space.

In a preferred embodiment of the vehicle roof according to the invention, which is advantageous in terms of design for a number of vehicle types, the cover links and the rear guide rails, each projected in the vehicle vertical direction, have a curved track profile, which is preferably adapted to the profile of the respective lateral roof contour.

Alternatively it is also feasible for the rear guide rail section and the cover link, at least in the projection in the vehicle vertical direction, to have an at least approximately vertical profile. In this case the respectively assigned curve profile of the rear guide rail section and the cover link has an infinite radius of curvature, so that the respective tangents coincide with the curve profile. The term 'tangent' is therefore to be interpreted in its widest sense.

In an appropriate embodiment of the vehicle roof according to the invention the front sliding units are preferably each connected to a first drive lever and the rear sliding units are each connected to a second drive lever. The second drive or tilting lever of the respective rear sliding unit is preferably guided by a sliding element on the rear guide rail section and by a slider on the cover link.

Further advantages and advantageous developments of the subject matter of the invention are set forth in the description, the drawing and the patent claims.

An exemplary embodiment of the vehicle roof according to the invention is represented in simplified schematic form in the drawing and will be explained in more detail in the following description. In the drawing.

Figure 1:
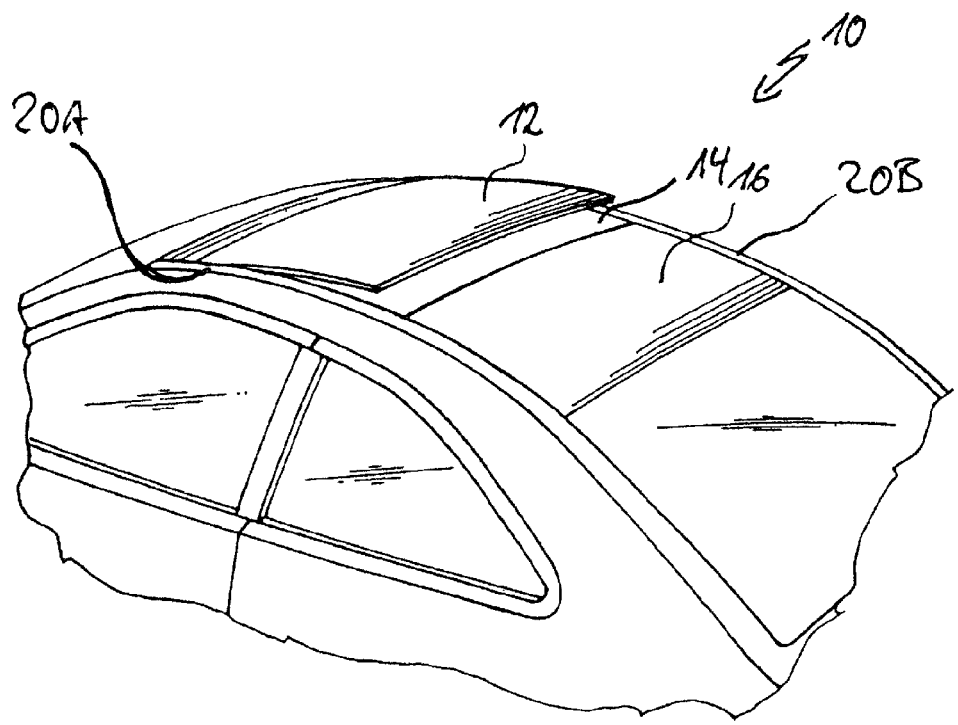
FIG. 1 shows a perspective view of a vehicle roof according to the invention with a cover element tilted.

The drawing represents a vehicle roof 10, which is provided with a roof opening system, which comprises a cover element 12, which serves for either closing or at least partially exposing a roof opening 14 and which is therefore adjustable between a closed position and an open position.

The cover element 12 constitutes a so-called rail-to-rail cover, the dimensions of which in a vehicle transverse direction differ at the rear and front edges and which in a closed position follow the lateral roof spars 20A and 20B. The width of the cover element at its front edge is therefore greater than at its rear edge.

Figure 2:
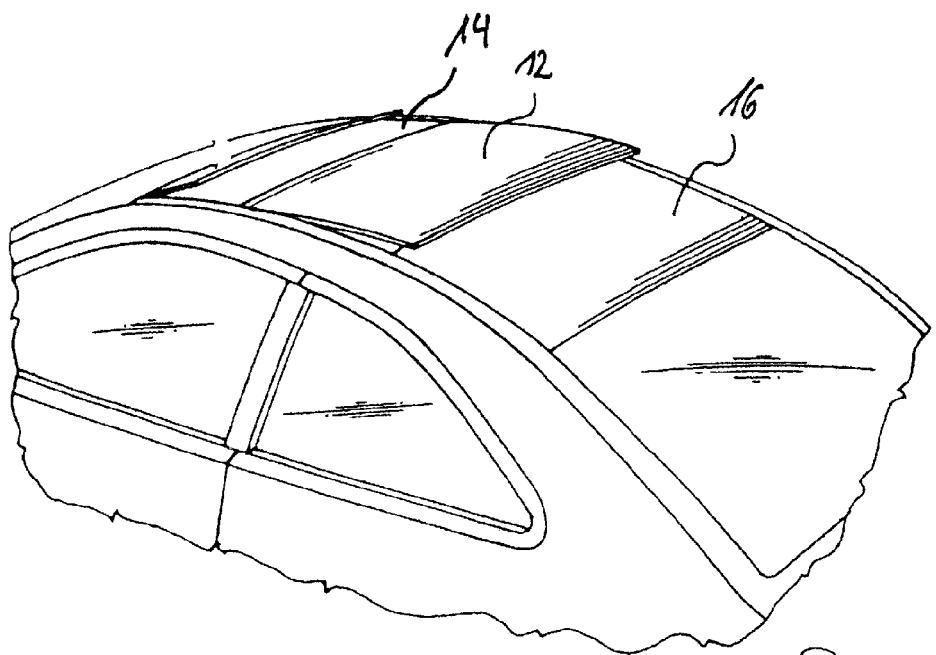
FIG. 2 shows a view corresponding to FIG. 1, but with the cover element traversed rearwards.

Starting from the closed position, the cover element 12 can be pivoted into the tilted ventilation position represented in FIG. 1, in which the rear edge of the cover element 12 is tilted upwards relative to the rear, fixed roof section 16. Proceeding from this ventilation position, the cover element 12, guided in a guide arrangement 18 on both sides relative to a vehicle longitudinal center plane, can be traversed rearward over the fixed roof area 16 towards the rear of the vehicle, as represented in FIG. 2. The cover element 12 therefore constitutes an externally running sliding roof.

Figure 3:
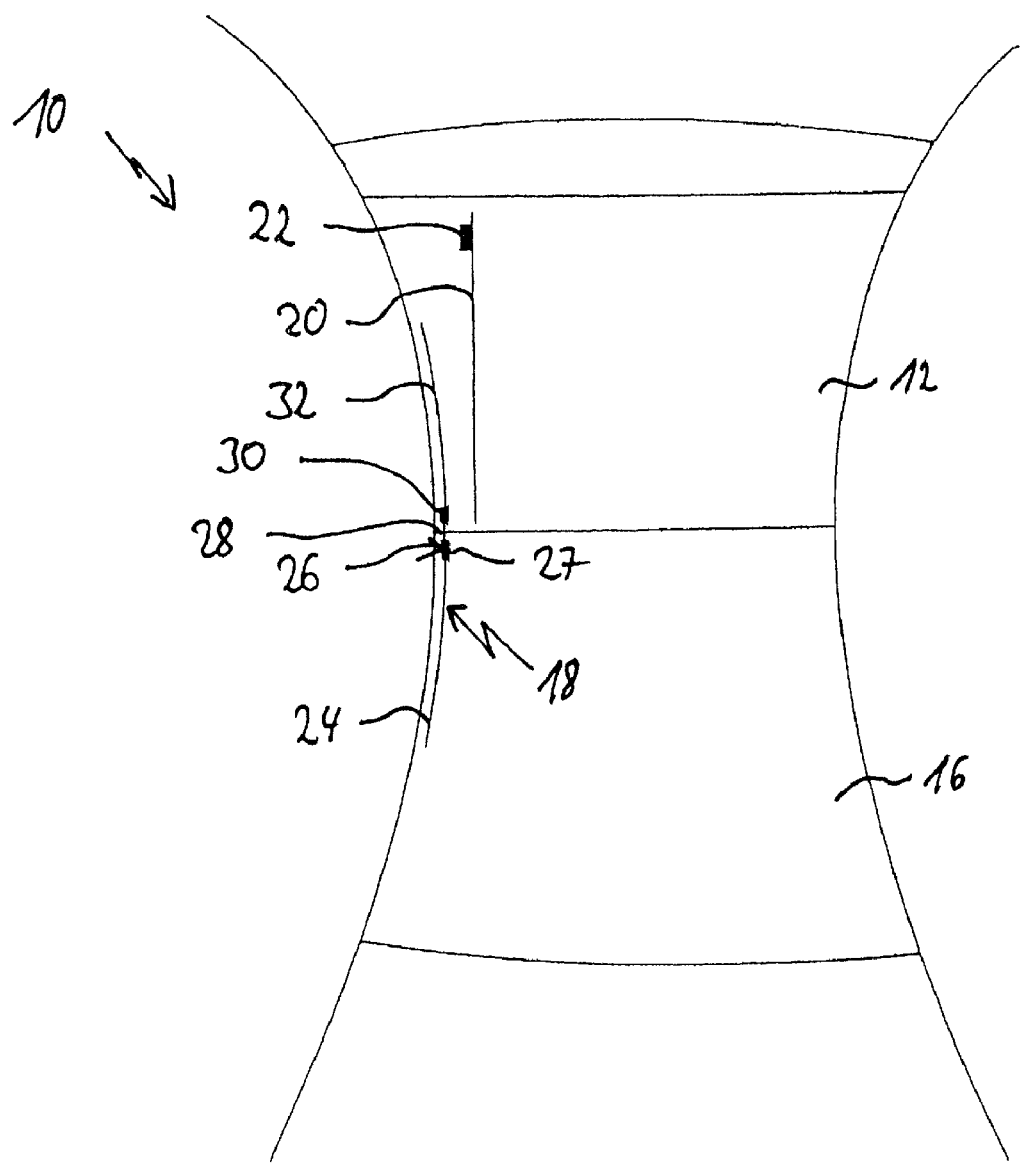
FIG. 3 shows a schematic top view of the vehicle roof with the cover element in the closed position.
Figure 4:
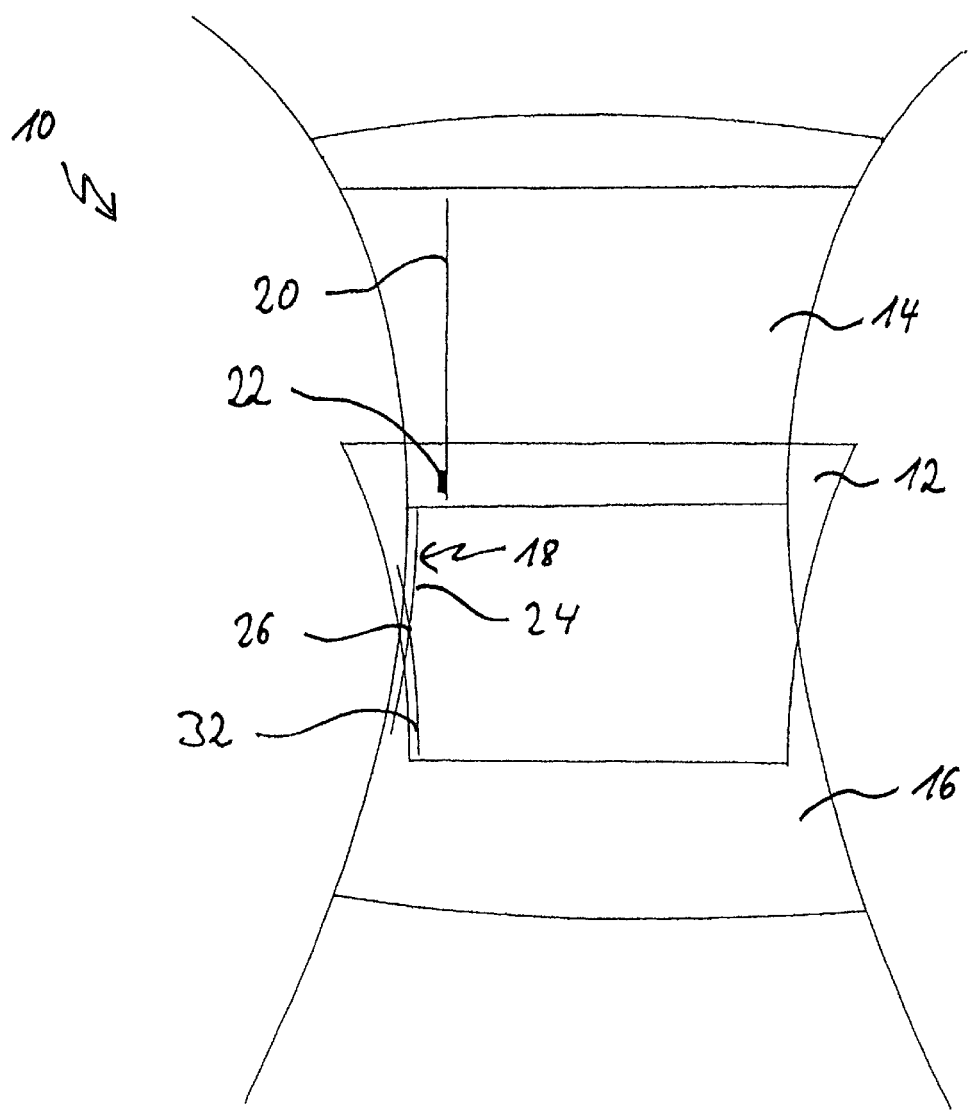
FIG. 4 shows a view corresponding to FIG. 3, but with the cover element in an open position.

As can be seen from the roof area located on the left in the direction of travel, particularly in FIGS. 3 and 4, the guide arrangements 18 each comprise a leading, front guide rail section 20 for a front sliding unit 22, which extends parallel to a vehicle longitudinal direction. In addition the guide arrangements 18 each comprise a rear guide rail section 24, which is located in the area of the rear, fixed roof section 16 and in which a rear sliding unit 26 is guided by means of a sliding element 27. Pivoted on the sliding element 27 is a rear tilting or drive lever 28, on which a slider 30 is formed, which is guided on a guide link 32, which is formed on the underside of the cover element 12 and therefore forms a guide rail for the relevant slider 30.

The front sliding units 22 each forming a front slide carriage and the rear sliding units 26 each forming a rear slide carriage are each connected to a drive cable. The drive cables of the sliding units 22 and 26 are driven at different speeds by a common drive unit, in such a way that the rate of travel of the front sliding units 22 is greater than that of the rear sliding units 26.

Projected in a vehicle vertical direction the rear guide rail section 24 has a curved track profile, which is formed parallel to the lateral roof contour, the outside of the curvature facing the vehicle longitudinal center plane. This allows the lateral roof spars 20A and 20B to be designed with a constant width over their entire extent in a vehicle longitudinal direction. At their respective inner edge facing the vehicle longitudinal center plane in the area of the fixed rear roof section 16 the lateral roof spars 20A and 20B here run along the relevant rear guide rail section 24, which defines a parting line or a roof slit.

The guide links 32, which are fixed to the cover element, each likewise have a curved track profile, which substantially follows the relevant lateral contour of the cover element 12 and the outside of the curvature of which likewise faces the vehicle longitudinal center plane.

As can be seen from FIG. 4 in particular, the guide link 32, which is formed on the cover element 12, and the rear guide rail section 24 have a profile such that their tangents, projected in the vehicle vertical direction, are set counter to the vehicle longitudinal axis, so that in this projection they intersect when the cover element is in the open position represented in FIG. 4. Over the travel of the cover element 12 the projected point of intersection between the rear guide rail section 24 and the guide link 32 shifts in the vehicle longitudinal direction and in the vehicle transverse direction. In the process, as the cover element 12 traverses rearwards into the open position, the sliding unit 26, which is located at this point of intersection and which comprises the sliding element 27, the tilting lever 28 and the slider 30, migrates outwards in a vehicle transverse direction relative to the vehicle longitudinal center plane, that is to say towards the outside of the vehicle. At the same time as the sliding or tilting unit 26 traverses in the rear guide rail section 24 the slider 30 moves along the link track 32 of the cover element 12.

The guide and link track 32 is therefore designed so that as it traverses towards the rear of the vehicle the sliding unit 26 forming one rear slide carriage, together with the sliding element 27, the tilting lever 28 and the slider 30, is always situated at the point of intersection between the rear guide rail section 24 and the link track 32. This design of the link track 32 means that the sliding unit 26 is able to move towards the outside of the vehicle without twisting, distorting or jamming, especially as the sliding unit 26 is connected to a separate drive cable, which at the projected point of intersection between the link track 32 and the guide rail section 24 always displaces the former rearwards. To absorb the forces acting on the sliding unit 26 as it traverses, the sliding unit 26 may be curved, elastic and/or provided with a spherical head bearing.

The inventive embodiment of the link track 32 and of the guide rail section 24, which is situated below the roof slit, through which the tilting lever 28 passes in the manner of a sword when the cover element 12 is in an open position, means that compensation in a vehicle transverse direction can be achieved solely by the relative movement between the sliding unit 26 and the cover element 12. It is therefore only necessary to provide the link tracks 32 on the underside of the cover element 12 and to design the link tracks 32 and the rear guide rail sections 24 so that they are curved or set in a direction counter to the vehicle longitudinal axis, in such a way that they follow the lateral edges of the cover element 12 and the rear, fixed roof section 16.

The invention claimed is:

1. A vehicle roof comprising a roof opening, which can be either closed or at least partially exposed by means of a cover element, which at its rear edge can be tilted relative to a fixed roof section and which is traversable above the fixed roof section towards the rear of the vehicle and which is guided on both sides relative to a vehicle longitudinal center plane by a front sliding unit in a leading guide rail section and by a rear sliding unit in a rear guide rail section respectively, characterized in that the rear sliding unit is guided on a guide link of the cover element and the tangents of the rear guide rail section and of the guide link of the cover element, projected in the vehicle vertical direction, are at least in part set counter to a vehicle longitudinal axis, so that the rear guide rail section and the guide link fixed to the cover in this projection intersect when the cover element is in an open position.

2. The vehicle roof of claim 1, characterized in that the guide link of the cover element and the rear guide rail section, projected in the vehicle vertical direction, each have a curved track profile.

3. The vehicle roof of claim 1, characterized in that the rear guide rail section runs parallel to a lateral roof contour.

4. The vehicle roof of claim 1, characterized in that the rear guide rail section for the rear sliding unit is of shorter design than the leading guide rail section for the front sliding unit.

5. The vehicle roof of claim 1, characterized in that the drive speed of the rear sliding unit is less than that of the front sliding unit.

* * * * *